United States Patent
Heuser et al.

(10) Patent No.: US 6,930,202 B1
(45) Date of Patent: Aug. 16, 2005

(54) PHOSGENE HAVING LOW CONTENT OF CARBON TETRACHLORIDE

(75) Inventors: Jürgen Heuser, Krefeld (DE); Hermann Kauth, Krefeld (DE); Christian Kords, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/807,851

(22) PCT Filed: Oct. 12, 1999

(86) PCT No.: PCT/EP99/07654

§ 371 (c)(1),
(2), (4) Date: Apr. 19, 2001

(87) PCT Pub. No.: WO00/24672

PCT Pub. Date: May 4, 2000

(30) Foreign Application Priority Data

Oct. 22, 1998 (DE) ................................ 198 48 668

(51) Int. Cl.$^7$ ................................ C07C 51/58; C07C 67/02
(52) U.S. Cl. ................................ 562/847; 562/848; 558/265
(58) Field of Search ................................ 562/847, 848; 558/265; 423/419.1, 464, 419.2

(56) References Cited

U.S. PATENT DOCUMENTS

| | | | |
|---|---|---|---|
| 4,048,292 A | 9/1977 | Green | 423/415 |
| 4,073,806 A | 2/1978 | Doubovetzky et al. | 260/544 K |
| 4,231,959 A * | 11/1980 | Obrecht | |
| 4,764,308 A | 8/1988 | Sauer et al. | 260/544 K |
| 4,839,458 A * | 6/1989 | Koga et al. | |

FOREIGN PATENT DOCUMENTS

| | | | |
|---|---|---|---|
| DE | 1 936 940 | 4/1970 | |
| DE | 33 27 274 | 2/1985 | |
| DE | 195 10 768 | 9/1996 | |
| EP | 0 003 530 | 8/1979 | C01B 31/28 |
| EP | 0 251 586 | 1/1986 | |
| EP | 0 796 819 | 9/1997 | |
| EP | 0 846 713 | 6/1998 | |
| FR | 2109186 | 5/1972 | C01B 31/00 |
| FR | 2 297 190 | 9/1976 | |
| GB | 583477 | 12/1946 | |
| GB | 2032406 | 5/1980 | |
| JP | 80014044 | 4/1980 | |
| JP | 9-059012 | 3/1997 | C01B 31/28 |
| WO | 97/30932 | 8/1997 | |
| WO | 98/00364 | 1/1998 | |
| WO | 98/28227 | 7/1998 | |

OTHER PUBLICATIONS

Database WPI, Section Ch, Week 199008, Derwent Publication Ltd., London, GB; AN 1990-054036 XP002022018 & JP 02 006307 A (Idemistsu Petrochem Co), Jan. 10, 1990.
Database WPI, Section Ch, Week, 199509 Derwent Publications Ltd., London, SB; AN 1995-063680 XP002125362 & JP 06 340408 A (Teijin Kasei Ltd), Dec. 13, 1994.
Patent Abstracts of Japan, vol. 1997, No. 07, Jul. 31, 1997, & JP 09 059012 A (Mitsubishi Gas Chem Co. Inc), Mar. 4, 1997.
Database WPI, Section Ch, Week 199543, Derwent Publications Ltd., London, GB; AN 1995-332595 XP002125361 & JP 07 228679 A (Mitsui Toatsu Chem Inc), Aug. 29, 1995.
Ullmann's Encyclopedia of Industrial Chemistry, 5$^{th}$ Completely Revised Edition, vol. A 19, (month unavailable) 1991, pp. 411-414, Wolfgang Schneider and Werner Diller, "Phosgene".
Phosgene and Related Carbonyl Halides, (month unavailable), 1996, pp. 276-280.
T. Anthony Ryan, Christine Ryan, Elaine A. Seddon and Kenneth R. Seddon, Batch Process III, Professional Process Development & Design, Dec. 4, 1996, Symposium Papers Continuous Process to Fit Batch Operation, pp. 6.1-6.6.

* cited by examiner

Primary Examiner—Johann Richter
Assistant Examiner—Sikarl A. Witherspoon
(74) Attorney, Agent, or Firm—Joseph C. Gil; Aron Preis

(57) ABSTRACT

A process for producing phosgene having low content of carbon tetrachloride is disclosed. The process entails reacting carbon monoxide with chlorine in the presence of elemental carbon, in a reactor. Critically the temperature of the gas stream emerging from the reactor is restricted to 30 to 80° C. and its pressure, measured directly downstream from said reactor is restricted to 120 to 400 kPa$_{abs}$. The phosgene thus produced has a content of carbon tetrachloride that is less than 150 ppm.

5 Claims, No Drawings

PHOSGENE HAVING LOW CONTENT OF CARBON TETRACHLORIDE

This invention relates to phosgene which is low in carbon tetrachloride, to a process for the production thereof, and to the use thereof for producing polycarbonates and polyester carbonates.

Phosgene is an important starting material for producing intermediates and final products in many branches of chemistry, particularly for the production of isocyanates, polycarbonate plastics and esters of chloroformic acid. Pure phosgene is a colourless, toxic gas which is susceptible to hydrolysis. Under normal pressure it boils at −127.8° C. and condenses at 7.56° C. to form a colourless liquid.

It is known that phosgene can be produced by the catalytic combination of carbon monoxide (CO) and elemental chlorine ($Cl_2$):

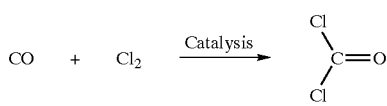

Activated carbon is mostly used as the catalyst. The reaction is exothermic and the conversion is almost complete. The reaction is usually conducted in tubular reactors which are made from standard steel or stainless steel and which are packed with catalyst. These tubes are generally cooled externally in order to dissipate the heat of reaction. Depending on the processing conditions, the phosgene which is produced by this process contains varying amounts of carbon tetrachloride ($CCl_4$) as an impurity. This is formed by unwanted secondary reactions such as disproportionation reactions, excessive chlorination of the carbon monoxide, chlorination of the carbon catalyst and chlorination of methane ($CH_4$). The degree of contamination by carbon tetrachloride of phosgene which is produced by commonly-used processes usually falls within the range from 250 to 2000 ppm.

The formation of carbon tetrachloride as a by-product during the production of phosgene is problematical from many aspects. Thus, due to the environmental harmfulness of chlorinated hydrocarbons, costly precautions have to be taken to ensure that the carbon tetrachloride formed in the reactions is not discharged into the environment. Moreover, even slight contents of carbon tetrachloride have a disadvantageous effect on some products which are manufactured from phosgene, particularly plastics. For example, high-purity phosgene with a carbon tetrachloride content of 250 ppm at most is required for the production of polycarbonate plastics, in order to prevent discoloration of the final product, which is normally colourless and transparent.

JP 88-156040 describes a process for producing phosgene which is low in carbon tetrachloride by the reaction of carbon monoxide with chlorine over activated carbon at 350° C., wherein the activated carbon catalyst is purified before reaction by treatment with acid to remove impurities such as transition metals, boron, aluminium and silicon. The phosgene which is produced by this process has a carbon tetrachloride content of 150 ppm. A disadvantage of this process, however, is the costly pretreatment of the activated carbon catalyst.

JP 80-014044 proposes a reactor for the conversion of chlorine and carbon monoxide into phosgene, in which the activated carbon catalyst is positioned at the reactor walls with the aid of a metal mesh. This arrangement prevents overheating of the catalyst bed. The phosgene which is produced in a reactor such as this at temperatures of 200 to 250° C. and at a throughput of 600 to 1200 l/h has a carbon tetrachloride content of 250 to 400 ppm. A disadvantage of this process, however, is that repacking the reactor with activated carbon when the activity of the latter decreases is more expensive than is the operation of conventional tubular reactors.

The underlying object of the present invention is to provide phosgene with an even lower carbon tetrachloride content.

This object is achieved by a grade of phosgene which contains less than the 150 ppm of carbon tetrachloride. The present invention further relates to a process for producing a grade of phosgene such as this by the reaction of carbon monoxide with chlorine in the presence of elemental carbon at a temperature of 30 to 80° C. and at a pressure of 120 to 400 $kpa_{abs}$ as measured directly downstream of the phosgene generator.

It is advantageously possible to conduct the process according to the invention in customary tubular reactors made of standard steel or stainless steel, the tubes of which are packed with the carbon catalyst. The tubular reactor can be operated continuously or batch-wise.

Carbon tetrachloride and chlorine are introduced into the reactor in approximately equal parts, preferably at room temperature. To ensure that all the chlorine is reacted, a slight excess of carbon monoxide can be used. Before they enter the reactor, the two reactants are preferably mixed in a suitable mixing device, in a static mixer for example.

Another advantage of the process according to the invention is that no special preparation of the catalyst is necessary.

The temperature of the gas stream emerging from the reactor should not exceed 70 to 80° C., as measured directly downstream of phosgene generator. The temperature of the gas stream emerging from the reactor in the process according to the invention is preferably 40 to 70° C. The gas stream is prevented from exceeding these temperatures with the aid of appropriate cooling devices which dissipate the heat of reaction which is released during the reaction and which prevent any overheating of the catalyst.

Activated carbon is preferably used as the carbon catalyst. Granular activated carbon with a grain diameter of 3 to 4 mm is preferably used as the catalyst. The pore surface area of the activated carbon is preferably about 1000 $m^2/g$. The apparent density of the activated carbon used is preferably about 450 g/l.

The pressure which is measured directly downstream of the phosgene reactor is preferably 300 $kPa_{abs}$, at most. It is thereby ensured that phosgene cannot condense in the reactor.

The phosgene which is produced by the process according to the invention and which emerges from the top of the reactor is preferably condensed at temperatures of −10 to −20° C. Due to its low carbon tetrachloride content of less than 150 ppm, it can be used directly, without further purification, for producing polymers comprising a carbonate bond, particularly polycarbonates or polyester carbonates.

The chlorine which is used in the reaction can be produced by customary industrial processes such as chlor-alkali electrolysis or hydrogen chloride electrolysis, and should be as pure as possible. Chlorine with a degree of purity higher than 98% is particularly suitable. Liquid chlorine from a storage vessel is preferably used. This is evaporated in a heated gasifier and is subsequently freed from any entrained liquid chlorine in a re-evaporator.

The carbon monoxide which is used in the reaction can be produced by customary methods, for example from natural gas/naphtha in a synthesis gas installation or by blowing coke with oxygen. It has proved to be particularly advantageous if the carbon monoxide has a methane content of less than 50 ppm.

The invention is explained in more detail below by means of examples.

EXAMPLE 1

500 Nm$^3$/h carbon monoxide with a purity of 97.5% and a methane content of 50 ppm as determined by on-line IR measurement (Method 2301-0207901-91D), and 480 Nm$^3$/h chlorine with a purity of 99.9% were mixed at room temperature and were fed to a phosgene generator packed with activated carbon (grain diameter about 4 mm, pore surface area about 1000 m$^2$/g, apparent density about 450 g/l). The generator was cooled so that the temperature of the phosgene formed, as measured directly after the phosgene left the generator, was 55° C. The pressure as measured directly after the phosgene left the generator was 80 kPa$_{gauge}$ (180 kPa$_{abs}$). The phosgene produced had a carbon tetrachloride content of 100 ppm.

EXAMPLE 2

500 Nm$^3$/h carbon monoxide with a purity of 98% and a methane content of 50 ppm as determined by on-line IR measurement (Method 2301-0207901-91D), and 480 Nm$^3$/h chlorine were mixed at room temperature and were fed to a phosgene generator packed with activated carbon (grain diameter about 4 mm, pore surface area about 1000 m$^2$/g, apparent density about 450 g/l). The generator was cooled so that the temperature of the phosgene formed, as measured directly after the phosgene left the generator, was 40° C. The pressure as measured directly after the phosgene left the generator was 40 kPa$_{gauge}$ (140 kPa$_{abs}$). The phosgene produced had a carbon tetrachloride content of 80 ppm.

COMPARATIVE EXAMPLE

500 Nm$^3$/h carbon monoxide with a purity of 98% and a methane content of 10 ppm were mixed at room temperature with 485 Nm$^3$/h chlorine and were fed to a phosgene generator as in Examples 1 and 2. The generator was cooled so that the temperature of the phosgene formed, as measured directly after it left the generator, was 85° C. The pressure, which was likewise measured directly after the phosgene left the generator, was 600 kPa$_{gauge}$ (700 kPa$_{abs}$). The phosgene produced had a carbon tetrachloride content of 290 ppm.

What is claimed is:

1. A process for producing phosgene having carbon tetrachloride content of less than 150 ppm by the reaction of carbon monoxide with chlorine in the presence of elemental carbon in a reactor, characterized in the complete reaction of the chlorine ensured by using carbon monoxide in slight excess and in that the gas stream emerging from the reactor is at a temperature of 30 to 80° C. and is under a pressure of 120 to 400 kPa$_{abs}$ as measured directly downstream of the phosgene generator.

2. A process according to claim 1, characterized in that the gas stream emerging from the reactor is at a temperature of 40 to 70° C.

3. A process according to claim 1 characterized in that the gas stream emerging from the reactor is under a pressure of 300 kPa$_{abs}$ at most.

4. A process according to claim 1 characterized in that the methane content of the carbon monoxide is 50 ppm at most.

5. In the process for producing phosgene by reacting a slight excess of carbon monoxide with chlorine the improvement comprising carrying out the reaction in the presence of elemental carbon, restricting the gas stream emerging from said reactor to a temperature of 30 to 80° C. to a pressure of 120 to 400 kPa$_{abs}$ as measured directly downstream from said reactor, said phosgene characterized in having a content of carbon tetrachloride that is less than 150 ppm.

* * * * *